(12) United States Patent
Graupner et al.

(10) Patent No.: US 9,633,332 B2
(45) Date of Patent: Apr. 25, 2017

(54) GENERATING MACHINE-UNDERSTANDABLE REPRESENTATIONS OF CONTENT

(75) Inventors: Sven Graupner, Mountain View, CA (US); Hamid Reza Motahari Nezhad, Los Altos, CA (US); Sujoy Basu, Sunnyvale, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 1818 days.

(21) Appl. No.: 12/835,044

(22) Filed: Jul. 13, 2010

(65) Prior Publication Data
US 2012/0016805 A1 Jan. 19, 2012

(51) Int. Cl.
*G06Q 10/00* (2012.01)
*G06Q 10/06* (2012.01)
*G06Q 10/10* (2012.01)

(52) U.S. Cl.
CPC ............ *G06Q 10/10* (2013.01); *G06Q 10/06* (2013.01)

(58) Field of Classification Search
USPC ........................... 705/342; 707/792, E17.098
See application file for complete search history.

(56) References Cited

U.S. PATENT DOCUMENTS

| | | | |
|---|---|---|---|
| 6,536,037 B1 | 3/2003 | Guheen | |
| 6,553,385 B2 * | 4/2003 | Johnson et al. | |
| 6,745,202 B2 | 6/2004 | Takahashi et al. | |
| 7,552,151 B2 * | 6/2009 | Betz et al. | |
| 7,613,602 B2 | 11/2009 | Kanawax | |
| 7,685,157 B2 | 3/2010 | Uchiyama et al. | |
| 2001/0032092 A1 * | 10/2001 | Calver | 705/1 |
| 2004/0024622 A1 | 2/2004 | Knight | |
| 2005/0283416 A1 | 12/2005 | Reid | |
| 2006/0031340 A1 | 2/2006 | Mathew | |
| 2007/0118391 A1 * | 5/2007 | Malaney et al. | 705/1 |
| 2007/0265895 A1 | 11/2007 | Moore | |
| 2007/0288258 A1 | 12/2007 | Beringer | |
| 2008/0098313 A1 | 4/2008 | Pollack | |
| 2008/0195611 A1 | 8/2008 | Chen et al. | |
| 2009/0006167 A1 | 1/2009 | Toussaint | |
| 2009/0172553 A1 | 7/2009 | Sikka et al. | |
| 2009/0241117 A1 | 9/2009 | Dasgupta | |
| 2010/0250236 A1 * | 9/2010 | Jagannathan et al. | 704/9 |
| 2011/0264483 A1 | 10/2011 | Nezhad | |
| 2011/0264592 A1 | 10/2011 | Graupner | |

(Continued)

OTHER PUBLICATIONS

Graupner, Sven et al—"Making Processes From Best Practice Frameworks Actionable"—HP Laboratories —HPL—2009-196— Published in the 3rd Business-driven IT Management (BDIM 2009), Hofstra University, Long Island, NY, Jun. 1-5, 2009—pp. 1-11.

(Continued)

*Primary Examiner* — Lynda Jasmin
*Assistant Examiner* — Johnathan Lindsey, III
(74) *Attorney, Agent, or Firm* — Trop, Pruner & Hu, P.C.

(57) ABSTRACT

An electronic document is accessed. A structural definition that defines a structural convention according to which information within the electronic document is arranged also is accessed. Based on the accessed structural definition, at least some of the information is extracted from the electronic document. A machine-understandable representation of the extracted information then is generated.

15 Claims, 7 Drawing Sheets

(56) References Cited

U.S. PATENT DOCUMENTS

2011/0264611 A1    10/2011    Graupner

OTHER PUBLICATIONS

Adams et al., The Application of Activity Theory to Dynamic Workflow Adaptation Issues, 7th Pacific Asia Conference on Information Systems, Jul. 10-13, 2003, Adelaide, South Australia (17 pages).
Rossberg, Pro Visual Studio Team Application Lifecycle Management, Apress, 2008, pp. 1-333.
U.S. Appl. No. 12/768,178, Non-Final Rejection dated Mar. 30, 2012, pp. 1-11 and attachments.

* cited by examiner

| | A | B | C |
|---|---|---|---|
| 1 | Incident Management Process On-Boarding | | |
| 2 | Part Number: INCMAN-TASLST | | |
| 3 | Task Checklist | | |
| 4 | Phase - Activity | Task | Description |
| 5 | Assessment | | |
| 6 | Perform Gap Analysis | | |
| 7 | | Email | Send email to customer requesting current process documentation |
| 8 | | Audit | Identify any gaps between customer's and HP's processes |
| 9 | | Verify | Verify all data collected and reported |
| 10 | | Report | Finalize Gap analysis report |
| 11 | LDSS Template | | |
| 12 | | Tools team | Contact tools team to discuss LDSS template completion plan |
| 13 | | Towers | Send LDSS template to all towers and request completion |
| 14 | | Verify | Verify all templates received back from towers |
| 15 | | Tools team | Send all collected templates to the tools team |
| 16 | Populate Customer Template | | |
| 17 | | Template | complete all incident templates to be loaded to the tool |
| 18 | | Tools team | Send completed templates to tools team |
| 19 | | Verify | Verify the templates were correctly loaded to the tool |
| 20 | Conduct JTOC Audit | | |
| 21 | | Verify | Verify all users are setup with access to the tool |
| 22 | Process Walkthrough | | |
| 28 | Internal Workflow | | |
| 42 | Touch-point Workshops | | |
| 60 | Work Instructions | | |
| 68 | Documentation | | |
| 94 | Training | | |
| 110 | Implementation | | |
| 122 | Stabilization | | |

FIG. 4A

```
#-------------------------------------------------
# Task property declarations
#declare subject
m1:Task a m2:GraphNode .

#declare properties on subject
m1:context a m2:Property ;
        m2:propertyOn m1:Task ;
        m2:ofType m2:GraphNode ;
        m2:cardinality m2:CardAny ;
.
m1:description a m2:Property ;
        m2:propertyOn m1:Task ;
        m2:ofType xsd:String ;
        m2:cardinality m2:CardOneOptional ;
.
m1:list a m2:Property ;
        m2:propertyOn m1:Task ;
        m2:ofType m2:RDFList ;
        m2:cardinality m2:CardOneOptional .
```

*FIG. 4B*

```
#------------------------------------------
:PerformGapAnalysis a m1:Task ;
        m1:context :Assessment ;
        m1:list ( :Email :Audit :Verify :Report );
.
:Email a m1:Task ;
        m1:context :PerformGapAnalysis ;
        m1:description "Send email to customer requesting current process documentation" ;
.
:Audit a m1:Task ;
        m1:context :PerformGapAnalysis ;
        m1:description "Identify any gaps between customer's and HP's processes" ;
.
:Verify a m1:Task ;
        m1:context :PerformGapAnalysis ;
        m1:description "Verify all data collected and reported" ;
.
:Report a m1:Task ;
        m1:context :PerformGapAnalysis ;
        m1:description "Finalize Gap analysis report" ;
.
```

GENERATING MACHINE-UNDERSTANDABLE REPRESENTATIONS OF CONTENT

FIELD

This disclosure relates to generating machine-understandable representations of content.

BACKGROUND

Languages for machine processing generally have formal syntaxes or semantics. Such formal syntaxes or semantics enable machines (e.g., computers) to understand and, when appropriate, take action(s) in response to expressions represented in languages for machine processing. In contrast to languages for machine processing, natural language content generally is not understandable to machines (e.g., computers) because the structure of natural language content generally does not conform to the formal syntax of any language for machine processing nor do natural languages have formal semantics.

DETAILED DESCRIPTION

A natural language electronic document generally is not machine-understandable because it generally does not conform to the formal syntax of any machine-understandable language and because natural languages generally do not have formal semantics. However, as described in greater detail below, a computing system that receives, as input, a structural definition defining a structural convention according to which a natural language electronic document (e.g., a text document or a spreadsheet) is arranged can use the input structural definition to extract information represented in the natural language electronic document. Thereafter, the computing system can convert the information extracted from the natural language electronic document into a machine-understandable form, which may allow the computing system and/or another machine to understand and, when appropriate, take action(s) in response to the information extracted from the natural language electronic document.

Machine-understandable representations of natural language electronic documents and systems configured to automatically generate machine-understandable representations of natural language electronic documents have many uses. In one example, a project management system is configured to automatically generate machine-understandable representations of business collateral documents (e.g., best practices documents outlining high-level objectives to be achieved while performing a business operation), which may be referred to as templates. After generating these machine-understandable templates representing such business collateral documents, the project management system may use the templates to automatically configure and populate an electronic (e.g., on-line) interactive collaboration portal to be utilized by members of a team formed to perform the business operation, including, for example, defining specific tasks to be completed by the team members in order to accomplish at least some of the high-level objectives specified by the corresponding best practices documents.

Figure 1:
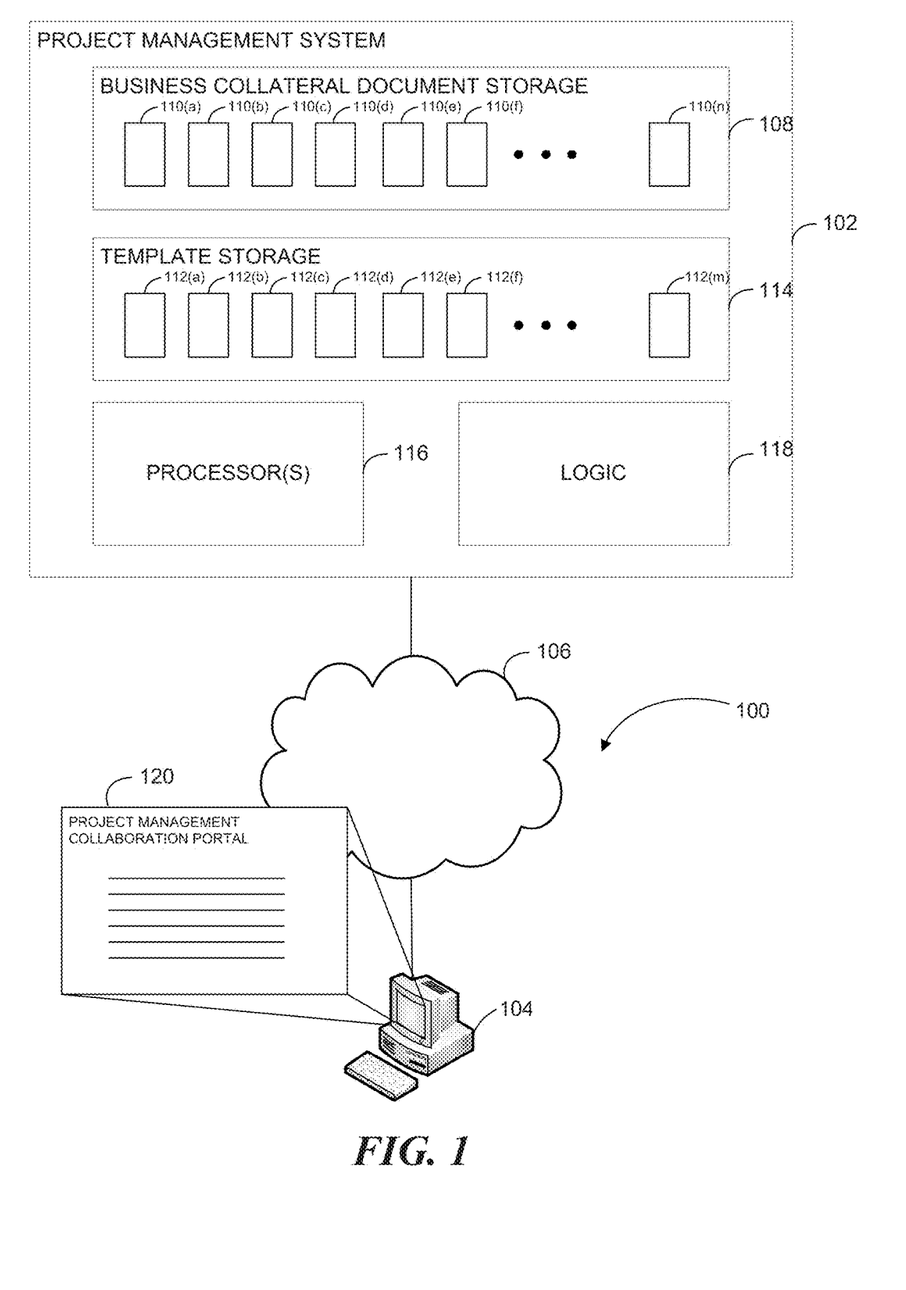
FIG. 1 is a block diagram of an example of an electronic communications network.

FIG. 1 is a block diagram of an example of an electronic communications network 100 that includes an example of a project management system 102. For illustrative purposes, several elements illustrated in FIG. 1 and described below are represented as monolithic entities. However, these elements each may include and/or be implemented on numerous interconnected computing devices and other components that are designed to perform a set of specified operations and that may be dedicated to a particular geographical region or, alternatively, that may be distributed across two or more disparate geographic locations.

As illustrated in FIG. 1, project management system 102 is accessible to a client computer 104 over a network 106.

Project management system 100 may be implemented as one or more computing devices (e.g., servers) configured to provide a project management service to one or more client devices (e.g., client computer 104) connected to project management system 100 over network 106.

The one or more computing devices on which project management system 100 is implemented may have internal or external storage components storing data and programs such as an operating system and application logic.

Specifically, as illustrated in FIG. 1, project management system 100 may include a business collateral document storage sub-system 108 storing a collection of business collateral documents 110(a)-110(n) and a template storage sub-system 112 storing a collection of templates 114(a)-114(m) that include machine-understandable representations of information extracted from one or more the business collateral documents 110(a)-110(n), these templates having been automatically generated by project management system 100 based on one or more the business collateral documents 110(a)-110(n) stored in business collateral document storage subsystem 108.

In addition, each of the one or more computing devices on which project management system 100 is implemented may include one or more processors 116 for executing instructions stored in storage and/or received from one or more other electronic devices, for example over network 106. In addition, these computing devices also typically include network interfaces and communication devices for sending and receiving data. Furthermore, project management system 100 also includes internal or external storage components storing application logic 118 comprising instructions that, when executed by the one or more processors 116, cause project management system 100 to provide project management services to one or more client devices (e.g., client computer 104).

Client computer 104 may include one or more general-purpose computers capable of responding to and executing instructions in a defined manner (e.g., personal computers, including desktop, laptop, tablet, and netbook computers, Smartphones, and personal digital assistants (PDAs)), one or more special-purpose computers, and/or one or more combinations of general purpose and special-purpose computers.

Furthermore, client computer 104 typically has internal or external storage components for storing data and programs such as an operating system and one or more application programs. Examples of application programs include authoring applications (e.g., word processing programs, database programs, spreadsheet programs, or graphics programs) capable of generating documents or other electronic content; client applications (e.g., e-mail clients) capable of communicating with other computer users, accessing various computer resources, and viewing, creating, or otherwise manipulating electronic content; and browser applications capable of rendering standard Internet content, such as, for example, content made available by project management system 102.

Furthermore, client computer 104 typically includes one or more central processing units (CPUs) for executing instructions stored in storage and/or received from one or more other electronic devices, for example over network 106. Client computer 104 also may include communication devices for sending and receiving data. One example of such communications devices is a modem. Other examples include antennas, transceivers, communications cards, and other network adapters capable of transmitting and receiving data over network 106 through a wired or wireless data pathway.

Network 106 may provide direct or indirect communication links between project management system 102 and client computer 104 irrespective of physical separation between the one or more computing devices on which project management system 102 is implemented and client computer 104. As such, the one or more computing devices on which project management system 102 is implemented and client computer 104 may be located in close geographic proximity to one another or, alternatively, the one or more computing devices on which project management system 102 is implemented and client computer 104 may be distributed across vast geographic distances. Examples of network 106 include the Internet, the World Wide Web, WANs, corporate or enterprise intranets, local area networks (LANs), analog or digital wired and wireless telephone networks, radio, television, cable, satellite, and/or any other delivery mechanisms for carrying data.

The business collateral documents 110(a)-110(n) stored in business collateral document storage sub-system 108 generally are natural language documents that are not machine-understandable. In some implementations, such business collateral documents may include best practices frameworks setting forth high-level descriptions of repeatable techniques, processes, activities, incentives, and/or objectives that, over time, have proven themselves as being effective for accomplishing certain operations. Such best practices frameworks may be employed in various different domains including business, governance, quality assurance, software development, performance management, risk management, and information technology (IT) management. Examples of different best practices frameworks include Six Sigma and ISO 9000 for quality assurance. In addition, balance score card is an example of a best practices framework for performance management using business metrics for decision making, and Enterprise Architecture frameworks such as TOGAF and Zachman aim to link business functions to IT, while COBIT is a best practices framework for IT governance. Meanwhile, the IT Infrastructure Library (ITIL), eTOM for telecom companies, and ISO/IEC 20000 are examples of different best practices frameworks for IT Service Management (ITSM).

Other examples of business collateral documents 110(a)-110(n) include service catalogs, for example, generated by an IT services or outsourcing provider to document repeatable services and to provide supporting materials to teams that are selling and/or providing IT services or outsourcing to different clients. Such service catalogs may provide domain information about different lifecycle stages of a project in the form of, for example, texts, spreadsheets, and/or process management documents. These business collateral documents then can be used by teams engaged in selling and/or providing IT services or outsourcing.

Best practices frameworks and other business collateral documents often represent the defined scope of work to be performed as high-level abstractions. However, these abstractions generally only specify the work that is to be performed rather than setting forth how this work is to be organized and performed. Thus, these abstractions may require specialization and refinement before being implemented in specific settings.

Stated differently, best practices frameworks and other business collateral documents often summarize a large amount of experience gathered and refined over many years by domain experts. However, implementing abstracted processes outlined in best practices frameworks generally involves refining and specializing the abstractions presented in the business collateral documents, mapping those abstractions into the target environment by creating organizations, roles, and processes appropriate for the target environment, and assigning responsibilities and tasks to the defined roles. While business collateral documents often define the scope of work to be performed, they typically do not define how this work should be organized and carried out by the assigned roles.

Application logic 118 executing on processors 116 of project management system 102 enables project management system 102 to extract information about the abstracted processes set forth in natural language in business collateral documents 110(a)-110(n) from business collateral documents 110(n)-110(n) and to represent this extracted information in machine-understandable form stored in templates 114(a)-114(m). Project management system 102 then uses these machine-understandable templates 114(a)-114(m) to drive automated interactions between project management system 102 and people, which enables actionable tasks appropriate to the specific context to be identified and assigned to team members (or organizations). Moreover, through these interactions, project management system 102 may create new templates and further refine existing templates 114(a)-114(m) to incorporate knowledge gained from the people with which project management system 102 interacts using templates 114(a)-114(m).

For example, as illustrated in FIG. 1, a user may utilize client computer 104 to access project management system 102 over network 106 to help derive, define, and assign actual actionable steps to be taken to accomplish a specific business operation. In such cases, project management system 102 may use one or more of templates 114(a)-114(m) to drive automated interaction with the user, ultimately using the interaction with the user and one or more of templates 114(a)-114(m) to identify specific tasks to be performed by assigned roles to complete the business operation according to the best practices and/or other knowledge recorded in the corresponding ones of templates 114(a)-114(m).

Thereafter, project management system 102 may generate and automatically populate a project management collaboration portal 120 that, for example, is hosted by project management system 102, is accessible to the team members and/or organizations responsible for completing the business operation, sets forth the specific tasks to be performed and the roles to which they have been assigned, enables tracking of progress towards completion of the specific tasks to be performed, and/or that provides additional supporting materials to assist the team members and/or organizations in completing the business operation.

Although FIG. 1 illustrates project management system 102 as being implemented on one or more computing devices that are distinct and remote from client computer 104 which accesses project management system 102 over network 106, in some implementations, project management system 102 may be implemented on a standalone computing device (e.g., a personal computer or a special-purpose computer) instead of being hosted by one or more remote computing devices.

Figure 2:
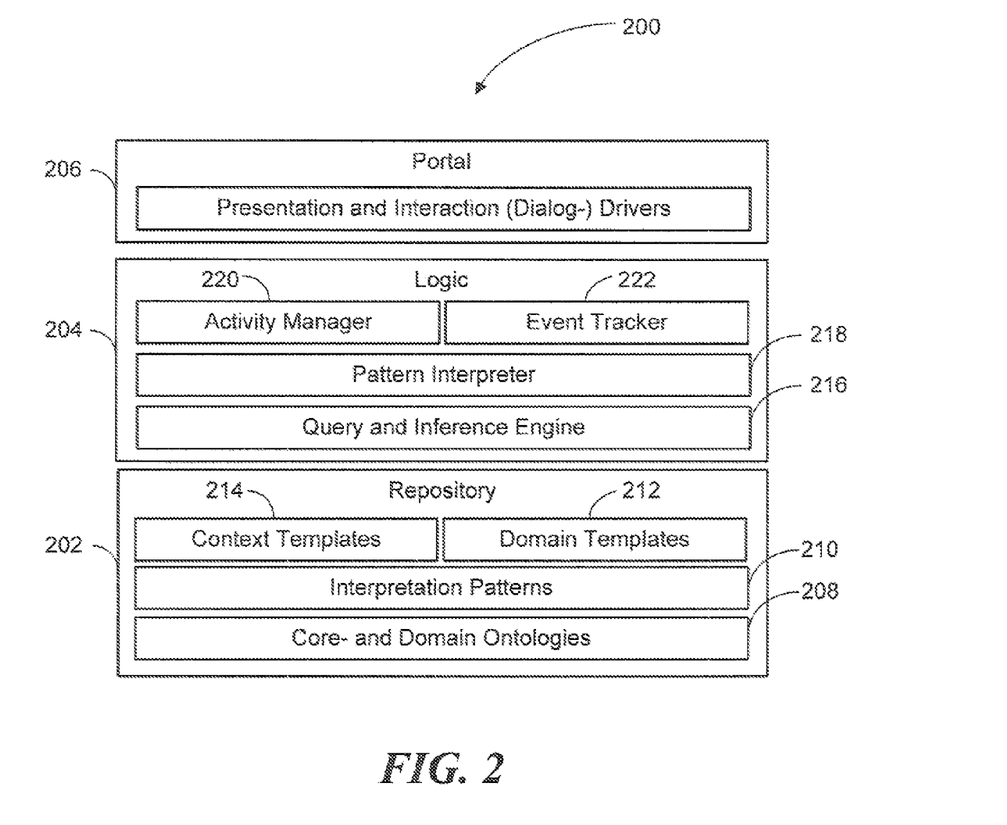
FIG. 2 is a block diagram of an example of a system architecture for a subsystem of a project management system that is configured to drive automated business interaction.

FIG. 2 is a block diagram of an example of a system architecture for a subsystem 200 of a project management system (e.g., project management system 102 illustrated in FIG. 1) that is configured to drive automated business interaction using machine-understandable templates. As illustrated in FIG. 2, the subsystem includes an information repository 202 as an information layer, a logic layer 204, and a portal 206 as a web access layer.

Information repository 202 stores information used by sub-system 200 to drive automated business interaction. For example, information repository stores core and domain ontologies, which define concepts that are understood by logic layer 204. Information repository 202 also stores interpretation patterns 210 that refer to concepts defined in the core and domain ontologies and that associate these concepts defined in the core and domain ontologies with concepts for which functionality exists in logic layer 204. General domain templates 212 and context templates 214, which are specific to business operations (e.g., projects), link concepts from core and domain ontologies 208 and interpretation patterns 210 together.

Logic layer 204 includes query and inference engine 216 for accessing information repository 202 in order to execute queries on and generate inferences about information stored in information repository 202. Pattern interpreter 218 loads and interprets patterns from information repository 202. Such pattern interpretation may be triggered by either or both of activity tracker 220 and event tracker 222. Activities may be triggered either as result of user interaction with sub-system 200 via portal 206 (e.g., a manager assigns a task to a team member) or as the result of a predefined condition being satisfied (e.g., the due date for a deliverable being reached). Events are associated with interpretation patterns 210, which describe reactions to events. Activity manager 220 may function as an interface between sub-system 200 and a process execution engine, enabling the transfer of events captured by event tracker 222 about the progress of an activity to the corresponding process instance in the process engine. In addition, activity manager 220 may enable changes in the process execution (e.g., creation of a new task in the workspace of a team member) to be returned to portal 206. Activity manager 220 also may be configured to update the process definition and process instance when an activity template (e.g., context template) is refined.

Portal 206 may be a web-based portal that enables user interaction with sub-system 200. For example, portal 206 may be configured to present information (e.g., information regarding the progress of activities) to users, while also initiating activities and facilitating the creation and refinement of templates.

Graupner, S., Motahari, H. R., Singhal, S., Basu, S., *Making Processes from Best Actionable Frameworks*, Second International Workshop on Dynamic and Declarative Business Processes (DDBP 2009), September 2009, which is incorporated herein by reference in its entirety, describes, in further detail, examples of techniques and systems for using machine-understandable templates generated from business collateral documents to drive automated business interactions and/or to derive actionable tasks to be performed in order to complete a project according to high-level objectives expressed in the business collateral.

As discussed above, a project management system may be configured to automate both the extraction of information from natural language business collateral documents as well as the generation of machine-understandable representations of such extracted information in the form of templates. Consequently, the project management system may enhance the efficiency, efficacy, and speed with which actionable steps for completing a business operation may be derived from a best practices framework and/or other business collateral without requiring domain experts who author such best practices frameworks and/or other business collateral to learn a machine-understandable language or other framework for representing information in a machine-understandable form.

Figure 3:
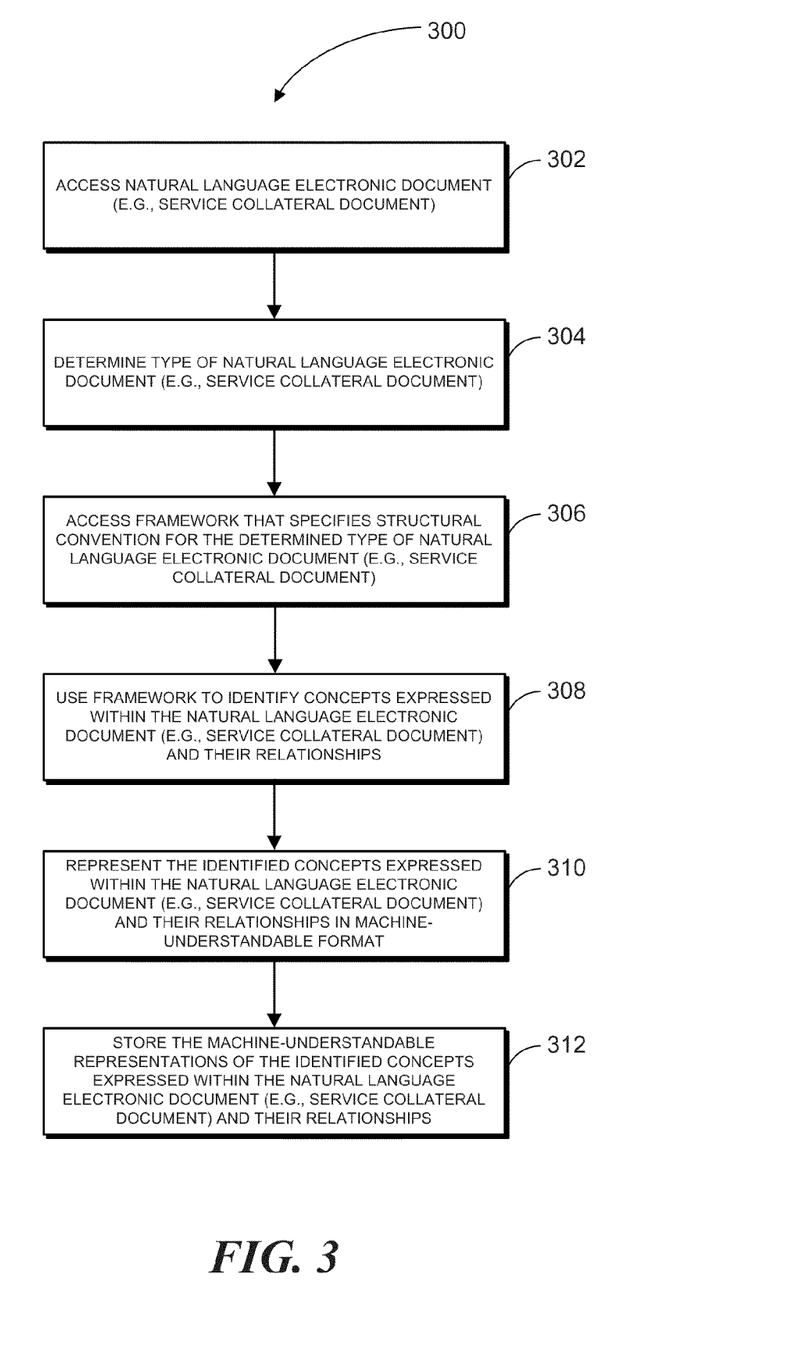
FIG. 3 is a flowchart of an example of a process for generating machine-understandable representations of a natural language electronic document.

FIG. 3 is a flowchart 300 of an example of a process for generating machine-understandable representations of a natural language electronic document. The process illustrated in the flowchart 300 of FIG. 3 may be performed by a project management system (e.g., project management system 102 illustrated in FIG. 1), for instance to extract information expressed in natural language from a business collateral document (e.g., one of business collateral documents 110(a)-110(n) stored in business collateral document storage sub-system 108 of project management system 102 illustrated in FIG. 1) and represent the extracted information in a template (e.g., one of templates 114(a)-114(m) stored in template storage sub-system 112 of project management system 102 illustrated in FIG. 1). More generally, the process illustrated in the flowchart 300 of FIG. 3 may be implemented by one or more processing elements of a computing system as a consequence of executing application code stored on a computer-readable storage device.

At block 302, the computing system accesses a natural language electronic document. Continuing with the example from above, the natural language electronic document may be a business collateral document. In some cases, such a business collateral document may be represented in the form of a spreadsheet, whereas in other cases the business collateral document may be represented in an alternative format such as a word processing document.

Figure 4A:
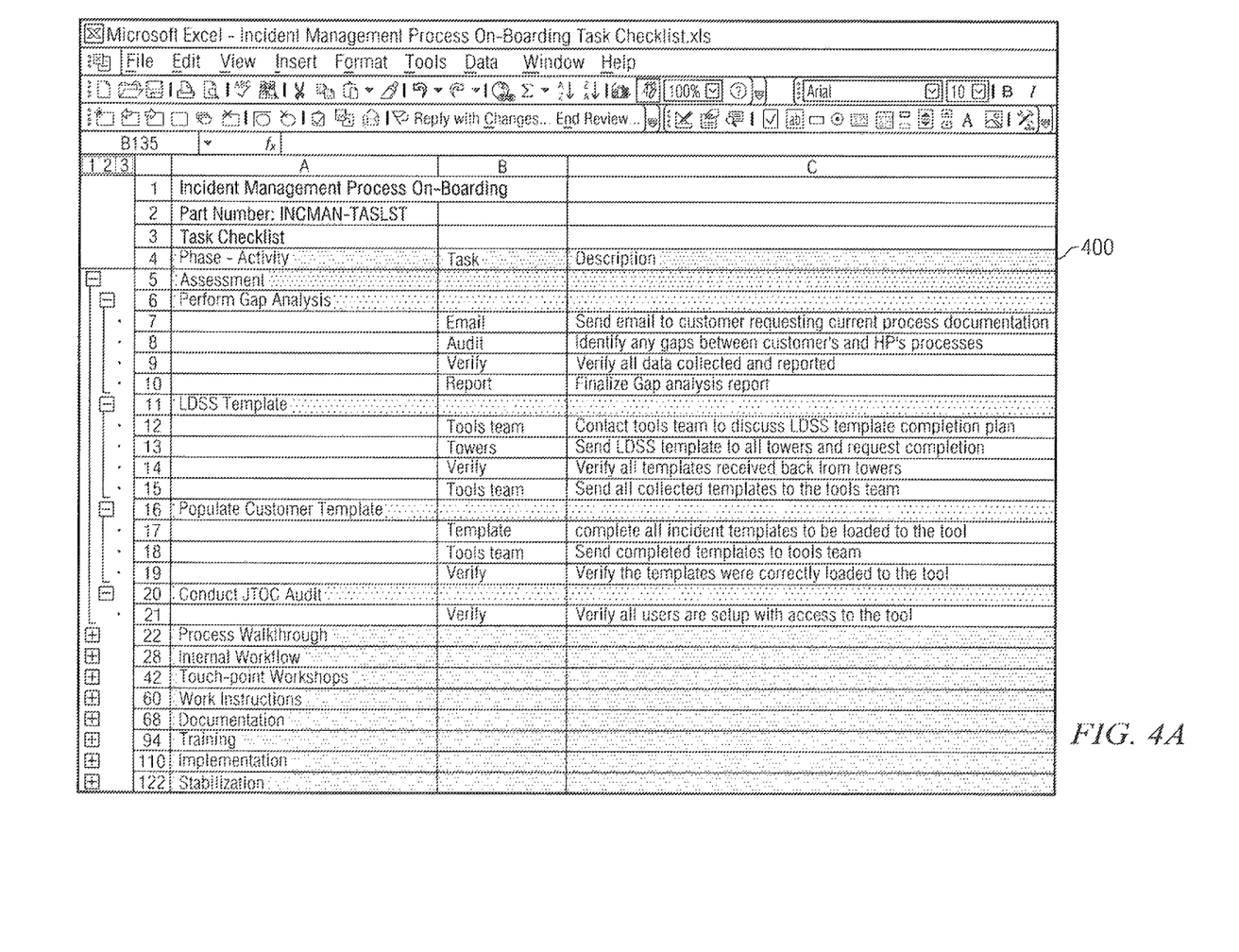
FIG. 4A is an example of a business collateral document in which information is expressed in natural language.

FIG. 4A presents an example of one type of business collateral document 400 represented in the form of a spreadsheet, in which information is expressed in natural language. As illustrated in FIG. 4A, business collateral document 400 is a task checklist represented in the form of a spreadsheet that sets forth an outline of tasks to be performed to complete a project. In addition, business collateral document 400 defines relationships between certain of the tasks to be performed. More particularly, business collateral document 400 uses a certain row and column structure that includes nested tasks to represent the tasks to be performed and relationships therebetween.

Although FIG. 4A presents an example of one type of business collateral document, other types of business collateral documents also exist, and information expressed in natural language in such other types of business collateral documents may be extracted and represented in machine-understandable form. For example, a business collateral document may be represented as a spreadsheet utilizing a different row and column structure than that of the business collateral document 400 illustrated in FIG. 4A. Alternatively, in some cases, a business collateral document may be represented as a word processing document having a defined structure based on the use of a specified heading convention.

In some implementations, the computing system may access the natural language electronic document from a persistent memory storage device. For example, the computing system may access a business collateral document (e.g., one of business collateral documents 110(a)-110(n) illustrated in FIG. 1) from a business collateral document storage system (e.g., business collateral document storage sub-system 108 of project management system 102 illustrated in FIG. 1). Alternatively, in some implementations, the computing system may receive the natural language electronic document (e.g., a business collateral document) as input from a user or another computing device, store the received natural language electronic document in temporary or persistent storage, and act upon the natural language electronic document responsive to its receipt.

At block 304, the computing system determines the type of the natural language electronic document accessed at block 302 based on the accessed natural language electronic document. For example, in the case of the business collateral document 400 illustrated in FIG. 4A, the computing system may determine that the business collateral document 400 is a task checklist represented in the form of a spreadsheet having a certain row and column structure. In contrast, in the case of the example of the business collateral document represented as a word processing document discussed above, the computing system may determine that the business collateral document is represented in the form of a word processing document that has a defined structure that is based on a specified heading convention.

Having determined the type of the natural language electronic document that was accessed at block 304, the computing system then, at block 306, accesses a framework that specifies a structural convention for the determined type of natural language electronic document. For example, in the case of the business collateral document 400 illustrated in FIG. 4A, the computing system accesses a framework that specifies a structural convention for a task checklist represented in the form of a spreadsheet having a particular row and column structure.

Figure 4B:
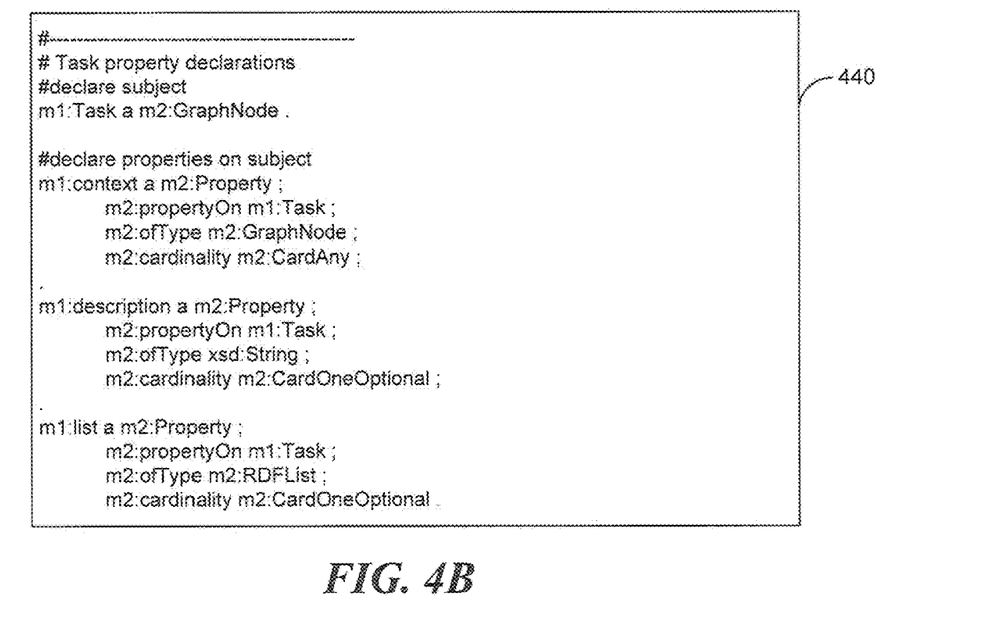
FIG. 4B is an example of a structural definition that defines a structural convention according to which information is arranged within the example business collateral document of FIG. 4A.

FIG. 4B presents an example of a framework 440 that specifies a structural convention for a task checklist represented in the form of a spreadsheet, such as, for example, the business collateral document 400 illustrated in FIG. 4A having a particular row and column structure. This framework 440 enables the computing system to identify information within and extract information from any business collateral document arranged according to the structural convention specified in framework 440. That is to say, framework 440 enables the computing system to identify information within and extract information from any business collateral document outlining a task checklist that is arranged according to the same row and column structure used to construct business collateral document 400 illustrated in FIG. 4A. In some respects, therefore, it may be said that the framework 440 designates the information (or at least the location within business collateral document 400 of the information) to be extracted.

As illustrated in FIG. 4B, framework 440 is expressed according to the Resource Description Framework (RDF) data model. More particularly, framework 400 is expressed using RDF statements in notation3 (N3) format.

Although the framework 440 illustrated in FIG. 4B is expressed according to the RDF data model, in some implementations, alternative formats may be used to specify structural conventions for different types of natural language electronic documents. For example, structural conventions for different types of natural language electronic document can be expressed using _Foundation for Intelligent Physical Agents (FIPA) Ontologies for Agents, Description Logics, Concept Graphs, and Knowledge Interchange Format (KIF).

As discussed above, other types of business collateral documents also exist besides task checklists represented in the form of a spreadsheet and arranged according to the same row and column structure used to construct business collateral document 400 illustrated in FIG. 4A. Thus, if, at block 304, the computing system determines that the accessed natural language document is of a type other than a task checklist represented in the form of a spreadsheet and arranged according to the row and column structure of the business collateral document 400 of FIG. 4A, at block 306, the computing system accesses a framework that specifies the structural definition that corresponds to the determined type of the accessed natural language electronic document. For example, if, at block 304, the computing system determines that the accessed natural language document is a business collateral document represented as a word processing document arranged according to a certain heading convention, the computing system, at block 306, accesses a framework that specifies a structural convention for word processing documents arranged according to the particular heading convention.

At block 308, the computing system uses the accessed framework to identify concepts and relationships between concepts that are expressed in natural language within the natural language electronic document. For example, in the case of the business collateral document 400 illustrated in FIG. 4A, the computing system uses the framework 440 illustrated in FIG. 4B to identify concepts, which, in this case are tasks, and relationships between certain of the tasks that are expressed in natural language within the task checklist represented in the form of a spreadsheet.

After identifying such concepts and relationships therebetween from within the natural language electronic document, the computing system extracts the identified concepts and relationships therebetween from the natural language electronic document and represents the extracted concepts and relationships therebetween in a machine-understandable format at block 310. For example, in the case of the business collateral document 400 illustrated in FIG. 4A, the computing system extracts tasks and relationships therebetween identified within business collateral document 400 from business collateral document 400 and represents the extracted tasks and relationships therebetween in a machine-understandable form.

Figure 4C:
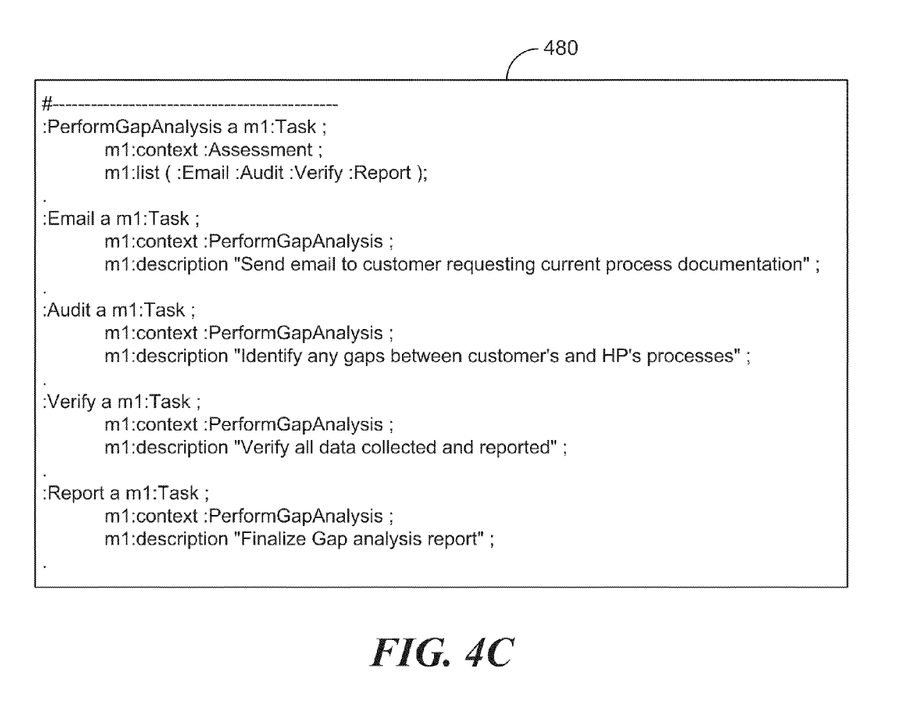
FIG. 4C is an example of a machine-understandable representation of information extracted from the business collateral document of FIG. 4A based on the structural convention defined in the structural definition of FIG. 4B.

FIG. 4C is an example of a portion of a template 480 that includes a machine-understandable representation of information extracted from the business collateral document of FIG. 4A based on the structural convention defined in the structural definition of FIG. 4B. In particular, the portion of the template 480 illustrated in FIG. 4C includes machine-understandable representations of the tasks and relationships therebetween expressed in rows six through ten of the spreadsheet of business collateral document 400 illustrated in FIG. 4A.

As illustrated in FIG. 4C, the RDF data model is used to represent the tasks and relationships expressed in template 480 in a machine-understandable form. More particularly, the tasks and relationships therebetween are expressed using RDF statements in N3 format. Thus, in template 480, tasks are annotated with semantic information allowing the tasks and relationships therebetween extracted from the natural language electronic document to be understood (e.g., interpreted) by a computer.

Although the template 480 illustrated in FIG. 4C represents tasks and relationships therebetween extracted from the business collateral document 400 illustrated in FIG. 4A according to the RDF data model, in some implementations, alternative formats may be used to represent concepts and relationships therebetween extracted from natural language electronic documents in a machine-understandable form. For example, concepts and relationships therebetween extracted from natural language electronic document may be expressed in machine-understandable form using FIPA Ontologies for Agents, Description Logics, Concept Graphs, and Knowledge Interchange Format.

After representing the concepts and relationships therebetween extracted from the natural language document in machine-understandable form at block 310, the computing system, at block 312, stores the computer-understandable representations of the identified concepts and relationships therebetween, for example, in a persistent computer memory storage system. For instance, the computing system may store the machine-understandable representations of the concepts and relationships therebetween extracted from the natural language electronic document as a template (e.g., one of templates 114(*a*)-114(*m*) illustrated in FIG. 1) in a template storage system (e.g., template storage sub-system 112 illustrated in FIG. 1) of a project management system (e.g., project management system 102 illustrated in FIG. 1). Then, as described above in connection with FIGS. 1 and 2, such a project management system may use the machine-understandable template to drive automated business interactions and/or to derive actionable tasks to be performed in order to complete a project according to high-level objectives expressed in the natural language electronic document.

Figure 5:
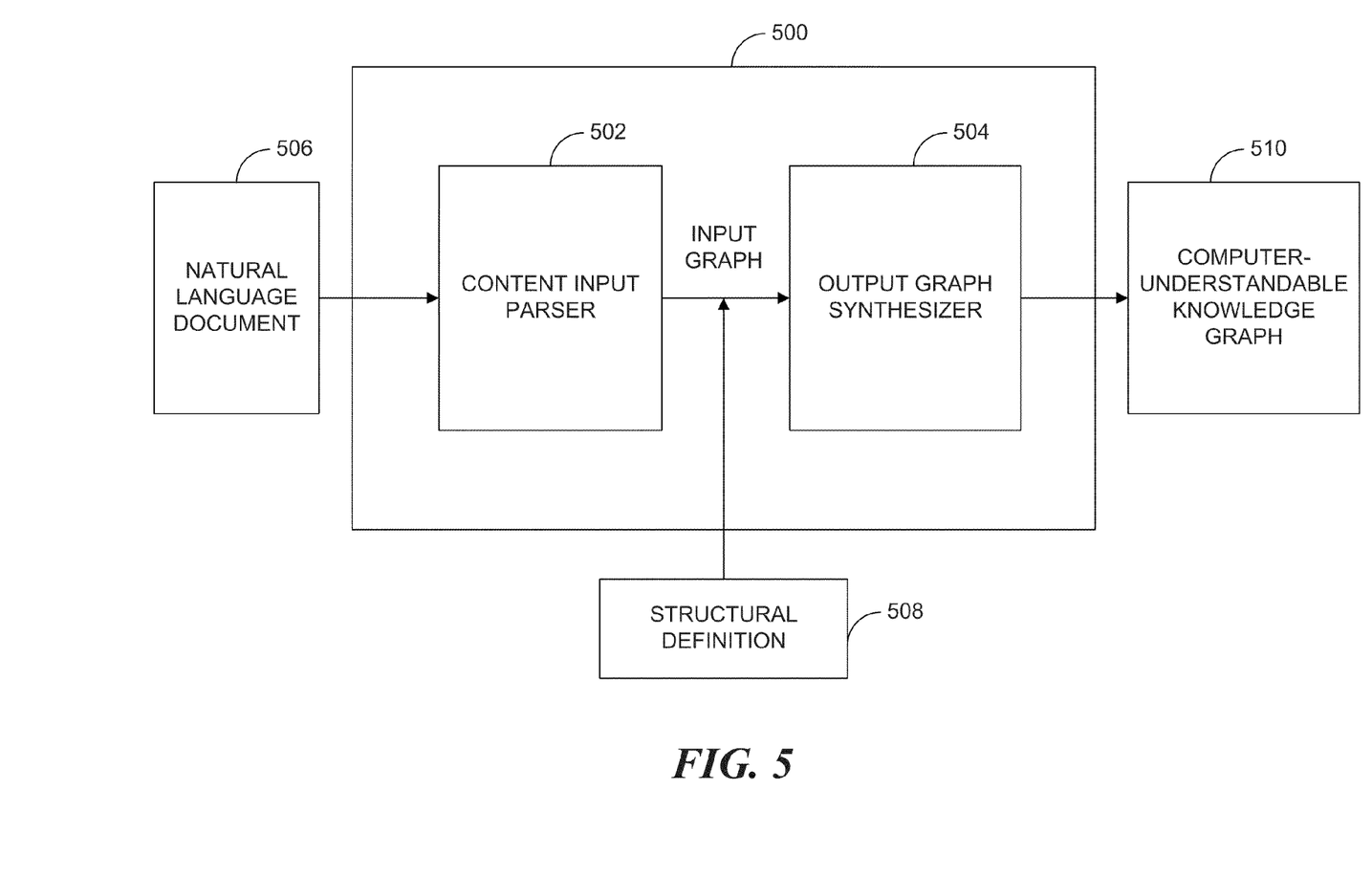
FIG. 5 is a block diagram of an example of a system for generating machine-understandable representations of a natural language electronic document.

FIG. 5 is a block diagram of an example of a system 500 for generating machine-understandable representations of natural language document. This system 500 illustrated in FIG. 5 may include and/or be implemented using one or more interconnected computing devices and other components that are designed to perform a set of specified operations.

As illustrated in FIG. 5, system 500 includes a content input parser 502 and an output graph synthesizer 504. System 500 is configured to receive a natural language document (e.g., a business collateral electronic document) 506 as input. Content input parser 502, meanwhile, is configured to scan the natural language document received by the system as input and to transform the natural language content from the document into an input graph representing the natural language content. System 500 also is configured to receive a structural definition 508 that defines a structural convention according to which natural language electronic document 506 is arranged. Output graph synthesizer 504 is configured to receive the input graph representation of the scanned natural language document and the structural definition 508 and to use the structural definition 508 to synthesize, from the input graph, a computer-understandable knowledge graph 510 representing concepts and relationships therebetween that are expressed in the input natural language document 506.

A number of methods, techniques, systems, and apparatuses have been described. The described methods, techniques, systems, and apparatuses may be implemented in digital electronic circuitry or computer hardware, for example, by executing instructions stored in computer-readable storage media.

Apparatuses implementing these techniques may include appropriate input and output devices, a computer processor, and/or a tangible computer-readable storage medium storing instructions for execution by a processor.

A process implementing techniques disclosed herein may be performed by a processor executing instructions stored on a tangible computer-readable storage medium for performing desired functions by operating on input data and generating appropriate output. Suitable processors include, by way of example, both general and special purpose microprocessors. Suitable computer-readable storage devices for storing executable instructions include all forms of non-volatile memory, including by way of example semiconductor memory devices, such as Erasable Programmable Read-Only Memory (EPROM), Electrically Erasable Programmable Read-Only Memory (EEPROM), and flash memory devices; magneto-optical disks; and Compact Disc Read-Only Memory (CD-ROM). Any of the foregoing may be supplemented by, or incorporated in, specially designed application-specific integrated circuits (ASICs).

Although the operations of the disclosed techniques may be described herein as being performed in a certain order, in some implementations, individual operations may be rearranged in a different order and/or eliminated and the desired results still may be achieved. Similarly, components in the disclosed systems may be combined in a different manner and/or replaced or supplemented by other components and the desired results still may be achieved.

What is claimed is:

1. A computer-implemented method comprising:
receiving a natural language electronic document;
determining that the received natural language electronic document is a specific type of natural language electronic document;
identifying, from among multiple different frameworks that specify corresponding structural conventions according to which natural language electronic documents are arranged, a specific framework as specifying a structural convention for the specific type of natural language electronic document, wherein the multiple different frameworks correspond to respective multiple different types of natural language electronic documents;
accessing, from computer memory storage, the identified framework;
based on the structural convention according to which the received natural language electronic document is arranged specified in the accessed identified framework, identifying, using one or more processing elements, concepts expressed within the received natural language electronic document and relationships between certain ones of the expressed concepts;
converting, using the one or more processing elements, the identified concepts expressed within the received natural language electronic document and the identified relationships therebetween into a template including computer-understandable code; and storing the template including computer-understandable code in computer memory storage.

2. The method of claim 1 wherein converting the identified concepts expressed within the received natural language electronic document and the identified relationships therebetween into the template including computer-understandable code includes representing the identified concepts and relationships therebetween as resource description framework (RDF) statements.

3. The method of claim 1 wherein:

identifying the concepts expressed within the received natural language electronic document and relationships therebetween further includes identifying properties of one or more of the concepts expressed within the natural received language electronic document; and converting the identified concepts expressed within the received natural language electronic document and the identified relationships therebetween into the template further includes converting the identified properties of the one or more concepts into the computer-understandable code of the template.

4. The method of claim 1 wherein receiving the natural language electronic document includes receiving an electronic document that includes natural language text.

5. The method of claim 1 wherein:

receiving the natural language electronic document includes receiving an electronic spreadsheet file that includes natural language content;

accessing the identified framework includes accessing a framework that specifies a structural convention according to which the natural language content included in the electronic spreadsheet file is arranged;

identifying the concepts expressed within the received natural language electronic document and relationships between certain ones of the expressed concepts includes identifying concepts expressed within the electronic spreadsheet file and the relationships therebetween; and converting the identified concepts expressed within the received natural language electronic document and the identified relationships therebetween into the template includes converting the identified concepts expressed within the electronic spreadsheet file and the identified relationships therebetween into the template.

6. The method of claim 5 wherein:

the electronic spreadsheet file includes a task checklist expressed in natural language; and the accessed identified framework specifies a structural convention according to which the task checklist is arranged.

7. The method of claim 1 wherein:

receiving the natural language electronic document includes receiving an electronic word processor file that includes natural language content;

accessing the identified framework includes accessing a framework that specifies a structural convention according to which the electronic word processing file is arranged;

identifying the concepts expressed within the received natural language electronic document and relationships between certain ones of the expressed concepts includes identifying concepts expressed within the electronic word processor file and the relationships therebetween;

converting the identified concepts expressed within the received natural language electronic document and the identified relationships therebetween into the template includes converting the identified concepts expressed within the electronic word processor file and the identified relationships therebetween into the template.

8. The method of claim 1 wherein receiving the natural language electronic document includes receiving a service collateral document that includes information related to a service to be provided expressed in a natural language.

9. The method of claim 8 wherein receiving the service collateral document includes receiving a document specifying best practices for performing a business operation.

10. The method of claim 9 wherein:

the accessed identified framework specifies a structural convention according to which the document specifying the best practices for performing the business operation is arranged;

identifying concepts expressed within the received natural language electronic document and relationships between certain ones of the expressed concepts includes identifying, within the document specifying best practices for performing the business operation, objectives to be completed while performing the business operation and relationships between certain ones of the objectives to be completed while performing the business operation based on the structural convention according to which the document specifying the best practices for performing the business operation is arranged; and converting the identified concepts expressed within the received natural language electronic document and the identified relationships therebetween into the template includes converting the business objectives to be completed while performing the business operation and relationships therebetween into the template.

11. The method of claim 1, wherein the received natural language electronic document is not machine-understandable.

12. A system comprising:

one or more processing elements; and one or more computer-readable storage media storing:

instructions that, when executed by the one or more processing elements, cause the one or more processing elements to:

receive a natural language electronic document;

determine that the received natural language electronic document is a specific type of natural language electronic document;

identify, from among multiple different frameworks that specify corresponding structural conventions according to which respective different types of natural language electronic documents are arranged, a specific framework as specifying a structural convention for the specific type of natural language electronic document;

use the identified framework to extract, from the received natural language electronic document, concepts expressed in the received natural language electronic document and relationships between certain ones of the concepts expressed in the received natural language electronic document, and represent the concepts and relationships therebetween extracted from the received natural language electronic document in a template of a computer-understandable format.

13. The system of claim 12 wherein the received natural language electronic document is a document specifying best practices for performing a business operation such that:

the identified framework specifies a structural convention according to which a type of document specifying best practices for performing a business operation is arranged.

14. The system of claim 12, wherein the received natural language electronic document is not machine-understandable.

15. A computer-implemented method comprising:

receiving an electronic document that is not machine-understandable;

determining that the received electronic document is a specific type of electronic document;

identifying, from among multiple different frameworks that specify corresponding structural conventions according to which respective different types of electronic documents are arranged, a specific framework as specifying a structural convention for the specific type of electronic document; and based on the structural convention in the identified framework:

extracting at least some of the information from the received electronic document, and generating a machine-understandable representation of the extracted information; and storing the machine-understandable representation of the extracted information in a template.

* * * * *